United States Patent
Fukushima

(10) Patent No.: US 12,136,150 B2
(45) Date of Patent: Nov. 5, 2024

(54) IMAGE GENERATION DEVICE, IMAGE GENERATION METHOD, AND PROGRAM

(71) Applicant: FUJIFILM Corporation, Tokyo (JP)

(72) Inventor: Toshimitsu Fukushima, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 246 days.

(21) Appl. No.: 17/581,065

(22) Filed: Jan. 21, 2022

(65) Prior Publication Data

US 2022/0254079 A1 Aug. 11, 2022

(30) Foreign Application Priority Data

Feb. 5, 2021 (JP) .................... 2021-017693

(51) Int. Cl.
*G06T 11/60* (2006.01)
*G06F 3/0482* (2013.01)
*G06F 3/04842* (2022.01)

(52) U.S. Cl.
CPC ............ *G06T 11/60* (2013.01); *G06F 3/0482* (2013.01); *G06F 3/04842* (2013.01)

(58) Field of Classification Search
CPC ... G06T 11/60; G06T 2200/24; G06F 3/0482; G06F 3/04842; G06F 3/04845
USPC ........................................................ 382/309
See application file for complete search history.

(56) References Cited

U.S. PATENT DOCUMENTS

| 2010/0083128 | A1 | 4/2010 | Kon et al. |
| 2014/0078177 | A1 | 3/2014 | Yamaji et al. |
| 2014/0201264 | A1* | 7/2014 | Soon-Shiong .......... G06F 3/048 709/203 |

FOREIGN PATENT DOCUMENTS

| JP | 2010-086221 A | 4/2010 |
| JP | 2014-075777 A | 4/2014 |

OTHER PUBLICATIONS

An Office Action; "Notice of Reasons for Refusal," mailed by the Japanese Patent Office on Sep. 24, 2024, which corresponds to Japanese Patent Application No. 2021-017693 and is related to U.S. Appl. No. 17/581,065; with English language translation.

\* cited by examiner

*Primary Examiner* — Stephen P Coleman
(74) *Attorney, Agent, or Firm* — Studebaker & Brackett PC

(57) ABSTRACT

Provided are an image generation device, an image generation method, and a program for a computer which can smoothly generate an edited image based on editing operations of a plurality of users.

A processor executes an image acquisition process of acquiring a material image provided by at least one of a plurality of users, an editing process of generating an edited image by using the acquired material image, an image output process of outputting the edited image to each of the plurality of users, an operation reception process of receiving an editing operation by each of the plurality of users with respect to the edited image for each user, an analysis process of analyzing a content of each of the editing operations received for each user, and a re-editing process of re-editing the edited image to generate a re-edited image based on a result of analysis in the analysis process.

20 Claims, 13 Drawing Sheets

FIG. 7
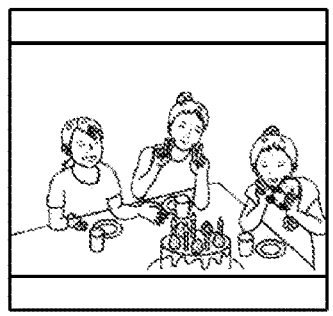
1
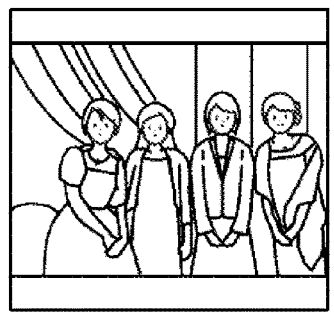
2
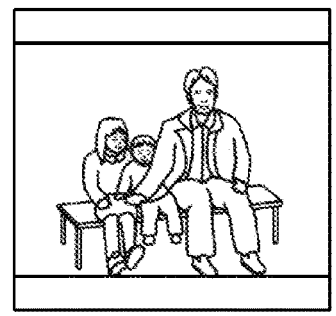
3
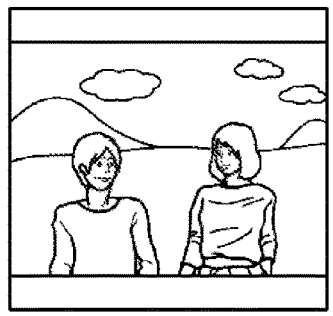
4
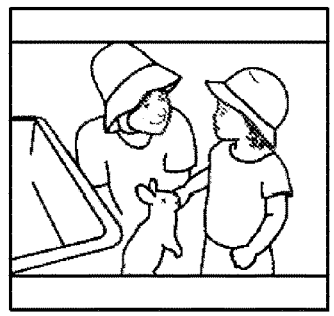
5
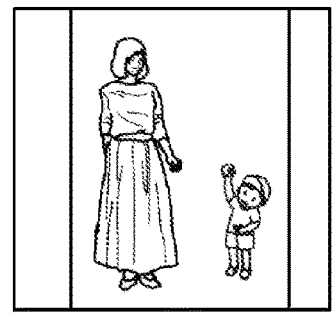
6
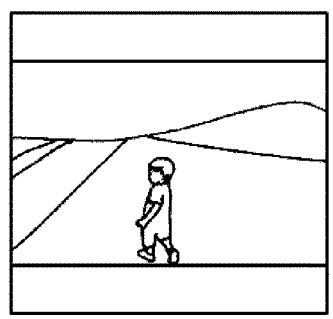
7

FIG. 8

| MATERIAL IMAGE | PROVIDING USER | POINT BASED ON DEGREE OF BLURRINESS AND SHAKING | POINT BASED ON DEGREE OF BRIGHTNESS | POINT BASED ON COLOR | THE NUMBER OF DETECTIONS OF PERSON (FACE) × 100 POINTS | SCORE (TOTAL VALUE OF POINTS) |
|---|---|---|---|---|---|---|
| #1 | A | 80 | 90 | 85 | 300 | 555 |
| #2 | A | 90 | 70 | 60 | 400 | 620 |
| #3 | A | 90 | 70 | 80 | 300 | 540 |
| #4 | A | 70 | 60 | 85 | 200 | 415 |
| #5 | B | 85 | 80 | 70 | 200 | 435 |
| #6 | B | 60 | 80 | 50 | 200 | 390 |
| #7 | B | 70 | 50 | 70 | 100 | 290 |

FIG. 11
RESULT OF EDITING OF USER A
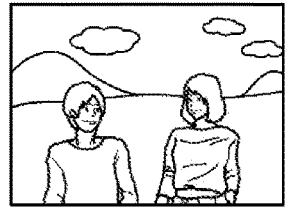
RESULT OF EDITING OF USER B
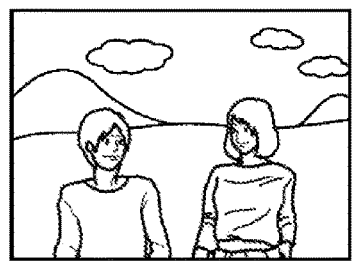
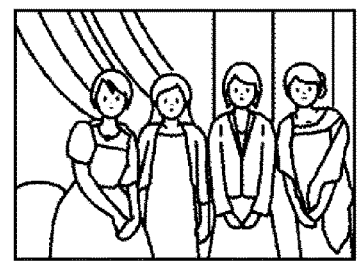
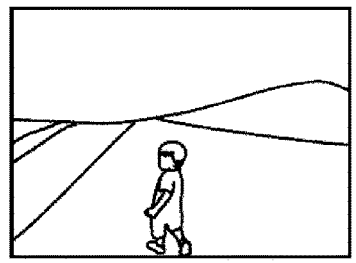
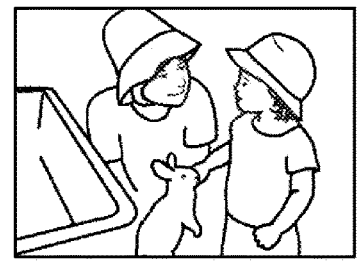

FIG. 12

| MATERIAL IMAGE | PROVIDING USER | ORIGINAL SCORE | SCORING STANDARD 1 | SCORING STANDARD 2 | SCORING STANDARD 3 | SCORING STANDARD 4 | SCORE |
|---|---|---|---|---|---|---|---|
| #1 | A | 555 | — | — | — | — | 555 |
| #2 | A | 620 | +50 | — | +20 | — | 690 |
| #3 | A | 540 | — | — | — | — | 540 |
| #4 | A | 415 | +50 | +50 × 2 | — | — | 565 |
| #5 | B | 435 | — | — | — | — | 435 |
| #6 | B | 390 | — | +50 | — | — | 440 |
| #7 | B | 290 | — | +50 | — | — | 340 |

IMAGE GENERATION DEVICE, IMAGE GENERATION METHOD, AND PROGRAM

CROSS-REFERENCE TO RELATED APPLICATIONS

The present application claims priority under 35 U.S.C. § 119 to Japanese Patent Application No. 2021-017693, filed on Feb. 5, 2021. The above application is hereby expressly incorporated by reference, in its entirety, into the present application.

BACKGROUND OF THE INVENTION

1. Field of the Invention

The present invention relates to an image generation device, an image generation method, and a program, and more particularly to an image generation device, an image generation method, and a program which edit a material image provided by a user to generate an edited image.

2. Description of the Related Art

A service that acquires a material image provided by a user, edits the material image depending on an order from the user to generate an edited image has already been provided. In addition, in the service described above, an editing operation may be received from each of a plurality of the users to perform image editing (see, for example, JP2010-086221A).

In the technology disclosed in JP2010-086221A, for example, in a case in which the plurality of users edit one image at the same time, editing authority is given to one user for each certain time or each time a certain amount of a process is performed, and the editing authority is given to each user in order.

SUMMARY OF THE INVENTION

With the technology disclosed in JP2010-086221A, the edited image can be generated with a configuration that is satisfied by the plurality of users, but the editing operations of the users are received in order, so that it takes time to complete the edited image. In addition, in a case in which different editing operations are performed between the users, it is necessary to adjust editing contents, so that the time necessary for image editing becomes longer.

The present invention has been made in view of the above circumstances, and is to provide an image generation device, an image generation method, and a program for a computer which can smoothly generate an edited image based on editing operations of a plurality of users.

In order to achieve the object described above, an aspect of the present invention relates to an image generation device comprising a processor, in which the processor executes an image acquisition process of acquiring a material image provided by at least one of a plurality of users, an editing process of generating an edited image by using the acquired material image, an image output process of outputting the edited image to each of the plurality of users, an operation reception process of receiving an editing operation by each of the plurality of users with respect to the edited image for each user, an analysis process of analyzing a content of each of the editing operations received for each user, and a re-editing process of re-editing the edited image to generate a re-edited image based on a result of analysis in the analysis process.

With the image generation device according to the aspect of the present invention, after generating the edited image by using the material image, the editing operation performed by each of the plurality of users with respect to the edited image is received for each user, the content of the editing operation of each user is analyzed, and re-editing (regeneration of the edited image) is performed based on the result of analysis. As a result, it is possible to smoothly generate the edited image (exactly the re-edited image) in consideration of opinions and requests of the users relating to image editing.

In addition, the processor may further execute an order reception process of receiving an order operation for image editing from each of the plurality of users. In this case, in the editing process, the processor may generate the edited image by using the material image based on a content of the order operation performed by at least one of the plurality of users.

With the configuration described above, it is possible to generate the edited image in accordance with the order from the user.

In addition, in the configuration described above, the order operation may include a setting operation relating to a layout of the material image in the edited image. In this case, it is possible to generate the edited image of the layout based on the setting operation of the user.

In addition, in the image acquisition process, the processor may acquire the material image from each of the plurality of users. In this case, the processor may further execute an evaluation process of evaluating each of the material images acquired in the image acquisition process based on a subject appearing in the material image and a feature amount relating to an image quality of the material image. In addition, in the editing process, the processor may generate the edited image by using the material image selected based on a result of evaluation in the evaluation process from among the material images acquired in the image acquisition process.

With the configuration described above, it is possible to evaluate each of the material images acquired from each of the plurality of users and appropriately select the material image used for generating the edited image based on the result of evaluation.

In addition, in the image acquisition process, the processor may acquire the material image from each of the plurality of users. In the analysis process, the processor may calculate a score corresponding to the content of each of the editing operations received for each user for each of the material images acquired in the image acquisition process. Moreover, in the re-editing process, the processor may generate the re-edited image by using the material image selected based on the score from among the material images acquired in the image acquisition process.

With the configuration described above, it is possible to calculate the score in accordance with the editing operation of each user for each of the acquired material images and appropriately select the material image used for generating the re-edited image based on a result of calculation.

In addition, in the configuration described above, the editing operation may be an operation for giving an instruction for any one of change or maintenance of the edited image, and the change of the edited image may include at least one of change of a layout of the material image in the edited image or change of a type of the material image used for generating the edited image. In this case, in the analysis process, the processor may calculate the score corresponding to a change content of the edited image in the editing operation for each of the material images acquired in the image acquisition process.

With the configuration described above, for the material image, the score is calculated corresponding to the change content performed by each user to the edited image. As a result, it is possible to perform the re-editing process (generation of the re-edited image) in consideration of the change content of each user.

In addition, in the analysis process, the processor may apply a scoring standard common between the users to the editing operation received for each user, and may calculate the score of each of the material images.

With the configuration described above, it is possible to appropriately calculate the score of the material image in accordance with the unified Scoring Standard regardless of a provider of the material image in a case in which the score is calculated for the material image.

In addition, in a case in which the score of a certain type of the material image among the material images acquired in the image acquisition process is calculated, the processor may calculate the score of the certain type of the material image in accordance with the number of users who give an instruction for adopting the certain type of the material image in the editing operation.

With the configuration described above, for the certain type of the material image, the score corresponding to the number of users who give the instruction for adopting the certain type of the material image is calculated. As a result, it is possible to appropriately determine whether or not to use the certain type of the material image for generating the re-edited image based on the intentions of the plurality of users.

In addition, in a case in which the score of an unused image which is not used for generating the edited image in the editing process among the material images acquired in the image acquisition process is calculated, the processor may add a predetermined addition value to the score of the unused image in a case in which a user who gives an instruction for adopting the unused image in the editing operation is present.

With the configuration described above, it is possible to promote use of the unused image in the generation of the re-edited image by adding the score of the unused image in a case in which the instruction for adopting the unused image is given in the editing operation.

In addition, in a case in which the score of a certain type of the material image among the material images acquired in the image acquisition process is calculated, the processor may calculate the score of the certain type of the material image in accordance with a layout of the certain type of the material image as instructed by the user in the editing operation in a case in which a user who gives an instruction for adopting the certain type of the material image in the editing operation is present.

With the configuration described above, in a case in which the user who gives the instruction for adopting the certain type of the material image in the editing operation is present, the score corresponding to the layout of the material image is calculated for the certain type of the material image. As a result, it is possible to appropriately determine whether or not to use the certain type of the material image for generating the re-edited image based on the intentions of the plurality of users.

In addition, in a case in which an instruction for adopting a plurality of the material images is given in the editing operation, the processor may specify a target subject based on a frequency of appearance in the plurality of material images from among subjects appearing in the plurality of material images, and may calculate the score of each of the material images in accordance with presence or absence of appearance of the target subject in the material image.

With the configuration described above, the score of each material image is calculated in accordance with the presence or absence of appearance of the target subject, so that it is possible to select the material image used for generating the re-edited image by reflecting the presence or absence of appearance of the target subject.

In addition, the processor may execute the analysis process after receiving the editing operations of all of the plurality of users in the operation reception process.

With the configuration described above, it is possible to analyze the editing operations of all of the plurality of users and reflect the result of analysis in the re-editing, so that it is possible to generate the re-edited image in consideration of the opinions and the requests of all of the plurality of users.

In addition, in the configuration described above, the edited image and the re-edited image may be images constituting each page of a photo book having at least one page or more.

With the configuration described above, it is possible to smoothly generate the edited image (exactly the re-edited image) which constitute each page of the photo book in consideration of the opinions and the requests of the users.

In addition, in order to achieve the object described above, another aspect of the present invention relates to an image generation method by a processor, the method comprising a step of executing, by the processor, an image acquisition process of acquiring a material image provided by at least one of a plurality of users, a step of executing, by the processor, an editing process of generating an edited image by using the acquired material image, a step of executing, by the processor, an image output process of outputting the edited image to each of the plurality of users, a step of executing, by the processor, an operation reception process of receiving an editing operation by each of the plurality of users with respect to the edited image for each user, a step of executing, by the processor, an analysis process of analyzing a content of each of the editing operations received for each user, and a step of executing, by the processor, a re-editing process of re-editing the edited image to generate a re-edited image based on a result of analysis in the analysis process.

With the method described above, it is possible to smoothly generate the edited image (exactly the re-edited image) based on the editing operations of the plurality of users.

In addition, still another aspect of the present invention relates to a program causing a computer to execute each step of the image generation method described above.

Moreover, still another aspect of the present invention relates to a computer-readable recording medium on which the program causing the computer to execute each step of the image generation method described above is recorded.

According to the present invention, after the edited image is generated from the material image, the re-editing based on the editing operations of the plurality of users can be performed, and the re-edited image can be smoothly generated.

BRIEF DESCRIPTION OF THE DRAWINGS

FIG. 7 is a diagram showing an example of a material image group of a target group.

FIG. 8 is a diagram showing an example of a result of evaluation in an evaluation process.

FIG. 11 is a diagram showing an example of a result of editing of each user with respect to the edited image.

FIG. 12 is a diagram showing an example of a result of analysis in an analysis process.

DESCRIPTION OF THE PREFERRED EMBODIMENTS

Figure 1:
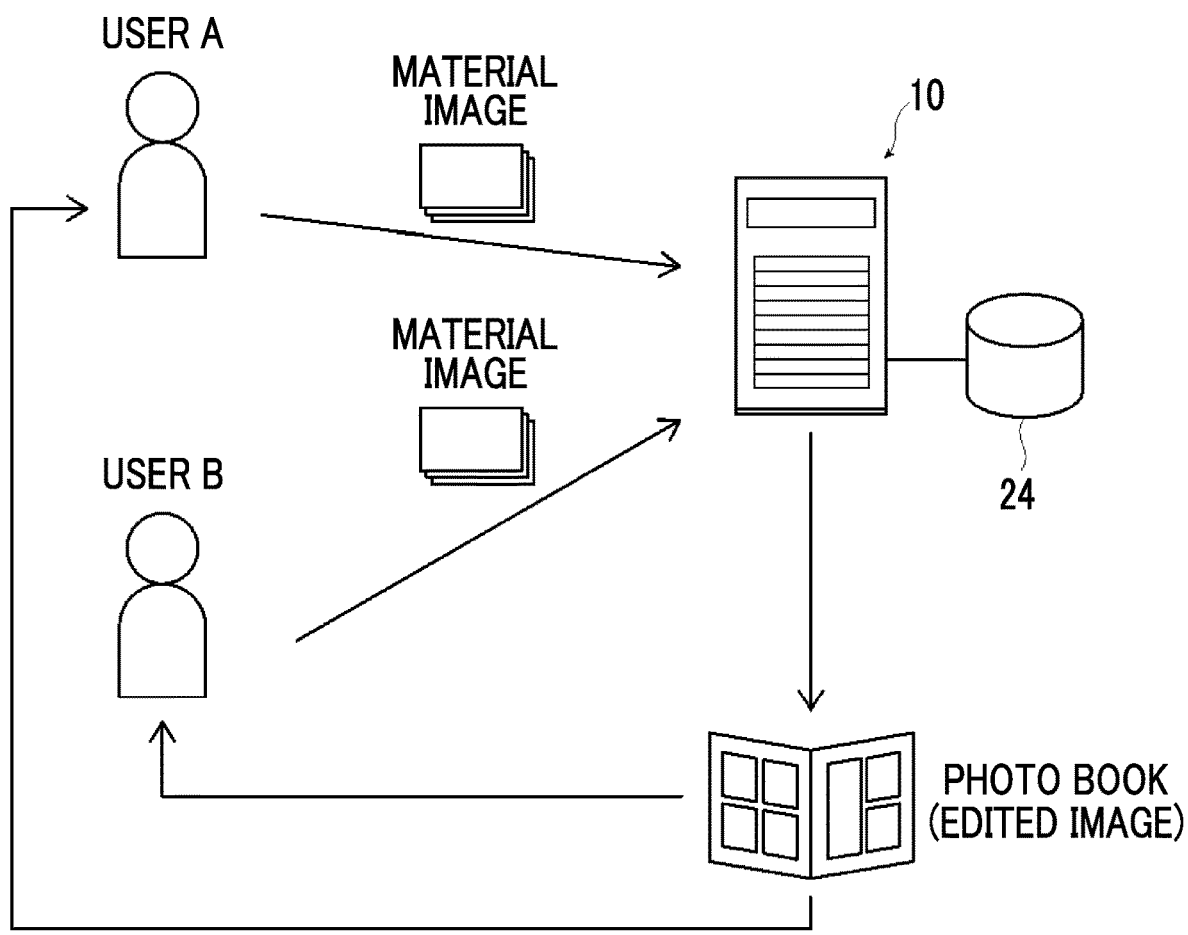
FIG. 1 is an explanatory diagram of an image generation device according to an embodiment of the present invention.

An image generation device, an image generation method, and a program according to an embodiment of the present invention will be described below with reference to one specific embodiment (the present embodiment) shown in the accompanying drawings.

Note that the embodiment described below is merely an example for the purpose of making easy description of the present invention, and does not limit the present invention. That is, the present invention is not limited to the embodiment described below, and various improvements or modifications can be made without departing from the gist of the present invention. In addition, the present invention includes an equivalent thereof.

In addition, in the present specification, an "image" shall be image data unless otherwise specified. Examples of the image data include lossy compressed image data, such as joint photographic experts group (JPEG) format, and lossless compressed image data, such as graphics interchange format (GIF) or portable network graphics (PNG) format.

Overview of Image Generation Device

The image generation device (hereinafter, image generation device 10) according to the present embodiment generates an edited image, specifically, receives an order from a user, performs image editing, and creates a photo book. The photo book corresponds to a photo album or the like, has at least one page or more, and each page is constituted by the edited images.

The edited image is an image constituted by editing one or more material images in a layout in accordance with the order of the user. The layout is a concept including a disposition position of the material image in the edited image, the number of material images in the edited image (that is, the number of images used), a size, and the like. The size is a posting size of the material image on each page of the photo book, such as A5, A4, or A5 square.

Note that the photo book may be a booklet in which the pages (edited images) are printed and collected as one data, or a digital photo book in which the image data of the pages (edited images) are collected as one data. In the following, a case will be described in which the photo book is created in an electronic data format.

In the present embodiment, it is possible to create the photo book shared by a plurality of the users belonging to the same group (hereinafter, referred to as a target group). The group is a unit for sharing the photo book and consists of two or more users. That is, the photo book for the target group is used or viewed by each user belonging to the target group. Note that the number of users belonging to the target group is not particularly limited.

In a case in which the photo book for the target group is created, the image generation device 10 acquires the image provided by each of the plurality of users belonging to the target group as a material image. Further, the image generation device 10 integrates a group of the material images acquired from the plurality of users belonging to the target group as a material image group of the target group.

Further, the image generation device 10 creates the photo book for the target group by using the material image group of the target group. Specifically, the image generation device 10 selects the material image used for creating the photo book from the material image group of the target group. Thereafter, the image generation device 10 edits the selected material image to generate the edited images for predetermined pages, and outputs the edited images for predetermined pages as the photo book for the target group.

In the present embodiment, the image generation device 10 re-edits the edited images which constitute the photo album for the target group based on the editing operation of each of the plurality of users belonging to the target group to generate re-edited images. The re-edited image, like the edited image, is an image that constitutes each page of the photo book having at least one page or more.

The editing operation is an operation performed on the edited image by each user of the target group, and more specifically, is an operation for giving an instruction any one of change or maintenance of the edited image. The change of the edited image includes at least one of change of a layout of the material image in the edited image or change of a type of the material image used for generating the edited image. Note that the "type of the material image" is a concept for identifying individual material images, for example, the type of the material image is specified by a file name or identification information given to the material image.

As described above, in the present embodiment, after the edited image is generated by using the material image provided by each user of the target group, the editing operation of each user can be received for each user and the edited image can be re-edited based on the editing operation of each user. As a result, the type and the layout of the material image used on each page of the photo book is determined in accordance with the editing operation of each user in the target group.

At a stage in which the photo book is finally finished, the edited images (specifically, the re-edited images) which constitute each page reflect intentions and requests of each user in the target group.

About Configuration of Image Generation Device

The image generation device 10 is configured by, for example, a computer, and more specifically, a server computer (hereinafter, simply referred to as a server). The number of computers that configure the image generation device 10 may be one or a plurality of computers.

Figure 2:
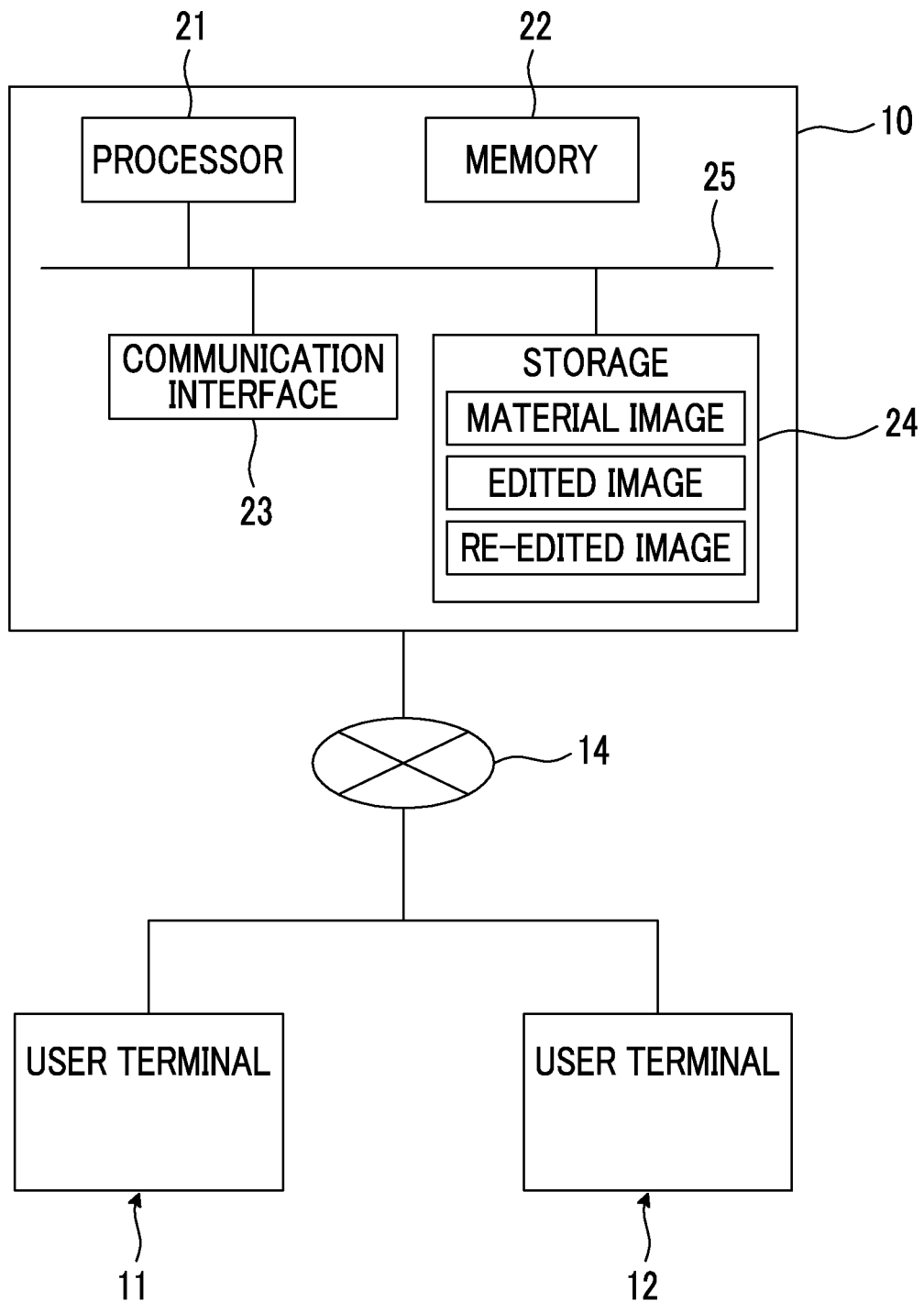
FIG. 2 is a diagram showing a configuration of the image generation device according to the embodiment of the present invention.

As shown in FIG. 2, the computer that configures the image generation device 10 includes a processor 21, a memory 22, a communication interface 23, a storage 24, and the like, and these devices are electrically connected via a bus 25. The processor 21 is configured by, for example, a central processing unit (CPU), a graphics processing unit (GPU), a digital signal processor (DSP), a tensor processing unit (TPU), and the like. The memory 22 is configured by a semiconductor memory, such as a read only memory (ROM) and a random access memory (RAM).

The image generation device 10 can communicate with user terminals 11 and 12 through the communication interface 23. The user terminals 11 and 12 are terminals operated by the user in a case of creating the photo book, and are configured by, for example, a desktop PC, a laptop, a tablet PC, a mobile terminal, such as a smartphone, or the like. Note that although only two user terminals 11 and 12 are shown in FIG. 1, the number of user terminals that can communicate with the image generation device 10 is not particularly limited.

A communication network 14 between the image generation device 10 and the user terminals 11 and 12 is not particularly limited. For example, a wireless local area network (LAN) based on Wi-fi (registered trademark), a network for mobile communication systems, such as 3G to 5G, or a communication network based on long term evolution (LTE) can be used. In addition, the image generation device 10 and the user terminals 11 and 12 may be connected by wire.

In addition, in the image generation device 10, a program for an operating system (OS) and an application program for ordering the photo book (hereinafter, order software) are installed as software. These programs correspond to a "program" according to the embodiment of the present invention, and by executing the program by the processor 21, the computer functions as the image generation device according to the embodiment of the present invention.

Since the order software is used by the plurality of users belonging to the same group, the order software is provided as, for example, a Web application. That is, the users in the target group operate the user terminals 11 and 12, respectively, to access the image generation device 10 and activate the order software. As a result, each user can provide the material image necessary for generating the edited image to the image generation device 10, and can request the order of the photo book, that is, the generation of the edited image.

The image generation device 10 accumulates the material image provided (input) by the user in the storage 24. The storage 24 may be a storage device built in or externally mounted on the image generation device 10, specifically, a memory device, such as a semiconductor memory, a hard disk drive (HD), or a solid state drive (SSD). Alternatively, an external computer, such as a database server, that is connected to the image generation device 10 so as to be communicable may be used as the storage 24.

The material image provided (input) by the user includes an image captured by a camera or the like mounted on the user terminal, an image captured by another imaging device and taken into the user terminal. In addition, an image obtained by scanning an old analog picture with a scanner or the like and digitizing the scanned old analog picture can be included in the material image.

The storage 24 stores the edited image generated by editing the material image and the re-edited image generated by re-editing the edited image in a photo book unit. The photo book (specifically, the edited image and the re-edited image which constitute each page of the photo book) in the storage 24 can be viewed by the user having viewing authority through the user terminals 11 and 12.

About Function of Image Generation Device

Figure 3:
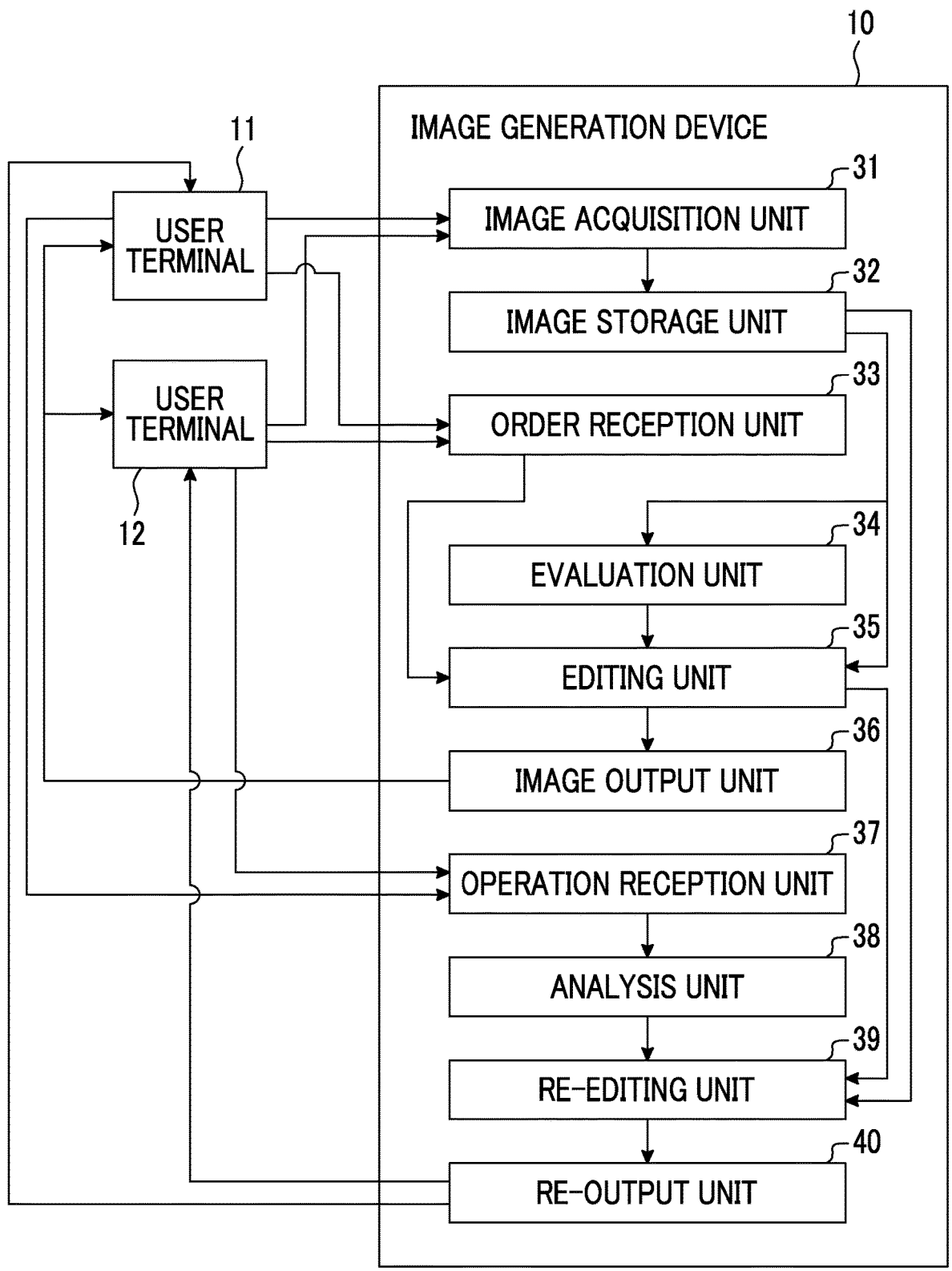
FIG. 3 is an explanatory diagram of a function of the image generation device according to the embodiment of the present invention.

A configuration of the image generation device 10 will be described again from a functional aspect. As shown in FIG. 3, the image generation device 10 includes an image acquisition unit 31, an image storage unit 32, an order reception unit 33, an evaluation unit 34, an editing unit 35, an image output unit 36, an operation reception unit 37, an analysis unit 38, a re-editing unit 39, and a re-output unit 40. Among these functional units, the image storage unit 32 is configured by the memory 22 or the storage 24 of the image generation device 10. The remaining functional units are realized by the collaboration between a hardware device provided in the image generation device 10 and the program described above.

In the following, each functional unit will be described. Note that, in the following, it is assumed that the image generation device 10 creates the photo book for the target group.

Image Acquisition Unit

The image acquisition unit 31 executes an image acquisition process of acquiring the material image provided by the user belonging to the target group. More specifically, in the image acquisition process, the image acquisition unit 31 receives the material images input (uploaded) from the user terminals 11 and 12 of the users via the network.

In the present embodiment, the material images are provided by all of the users belonging to the target group, and the image acquisition unit 31 acquires the material images from all of the users. Note that the material image is not limited to this, and the material image may be provided (input) by at least one user in the target group.

Image Storage Unit

The image storage unit 32 stores the material image acquired by the image acquisition unit 31 in association with the user who is a provider of the image. The description will be specifically made. A use account for using a photo book order service is given to the user, and each material image is stored in the image storage unit 32 in association with the use account of the user who is the provider of the image.

In addition, among the material images stored in the image storage unit 32, a group of the material images provided by the plurality of users belonging to the target group is integrated as the material image group of the target group and combined into one image group.

Order Reception Unit

The order reception unit 33 executes an order reception process of receiving the order operation from each of the plurality of users belonging to the target group. More specifically, in the order reception process, the user terminals 11 and 12 of the users input (upload) data indicating contents of the order operations performed by the users. The order reception unit 33 acquires (receives) the input data described above in the order reception process, and stores the acquired data in the memory 22 or the storage 24.

The order operation is an order operation for image editing, and is performed through an order screen (not shown) drawn on the user terminals 11 and 12 by activating the order software. The order operation includes a setting operation relating to various items necessary for creating the photo book, specifically, setting operations relating to the number of pages of the photo book, the layout of the material image on each page (that is, the edited image), and the like.

Evaluation Unit

The evaluation unit 34 executes an evaluation process of evaluating each of the material images acquired by the image acquisition unit 31, specifically, each of the material image groups of the target group. More specifically, in the evaluation process, the evaluation unit 34 calculates an evaluation value (hereinafter, referred to as a score) for each of the material image groups of the target group. The score calculated for each material image corresponds to a result of evaluation in the evaluation process.

An evaluation method of the material image in the evaluation process, that is, a calculation method of the evaluation value is not particularly limited. Note that regarding an evaluation standard (assign method of the score), it is preferable that the user who is the provider of the material image not be considered and the evaluation standard be common between the users.

Editing Unit

The editing unit 35 selects the material image to be used from the material image group of the target group stored in the image storage unit 32, and executes an editing process of generating the edited image by using the selected material image.

In the editing process, the editing unit 35 selects the material image to be used for generating the edited image from the material image group of the target group based on the score for each material image calculated in the evaluation process. For example, the material images may be ranked based on the score, and the edited image may be generated by using the top Nth material image (N is a natural number of 1 or more).

Thereafter, the editing unit 35 determines the layout of the selected material image and generates the edited image. At this time, the editing unit 35 determines the layout of the material image and generates the edited image based on the content of the order operation received by the order reception unit 33, specifically, the setting operation relating to the layout of the material image in the edited image. As a result, the edited images having the same number as the number of pages of the ordered photo book are generated.

Note that a selection standard for the material image and a determination method of the layout of the material image are not particularly limited.

As described above, the editing unit 35 automatically selects the material image used for generating the edited image, and automatically determines the layout of the selected material image in accordance with the order from the user. That is, in the present embodiment, by the function of the image generation device 10, the edited images for the number of pages of the photo book are automatically generated.

Image Output Unit

The image output unit 36 executes an image output process of outputting the edited image generated by the editing unit 35 to each user in the target group. More specifically, in the image output process, the image output unit 36 transmits display data of the edited image (hereinafter, referred to as edited image data) to the user terminals 11 and 12 of the users.

Figure 4:
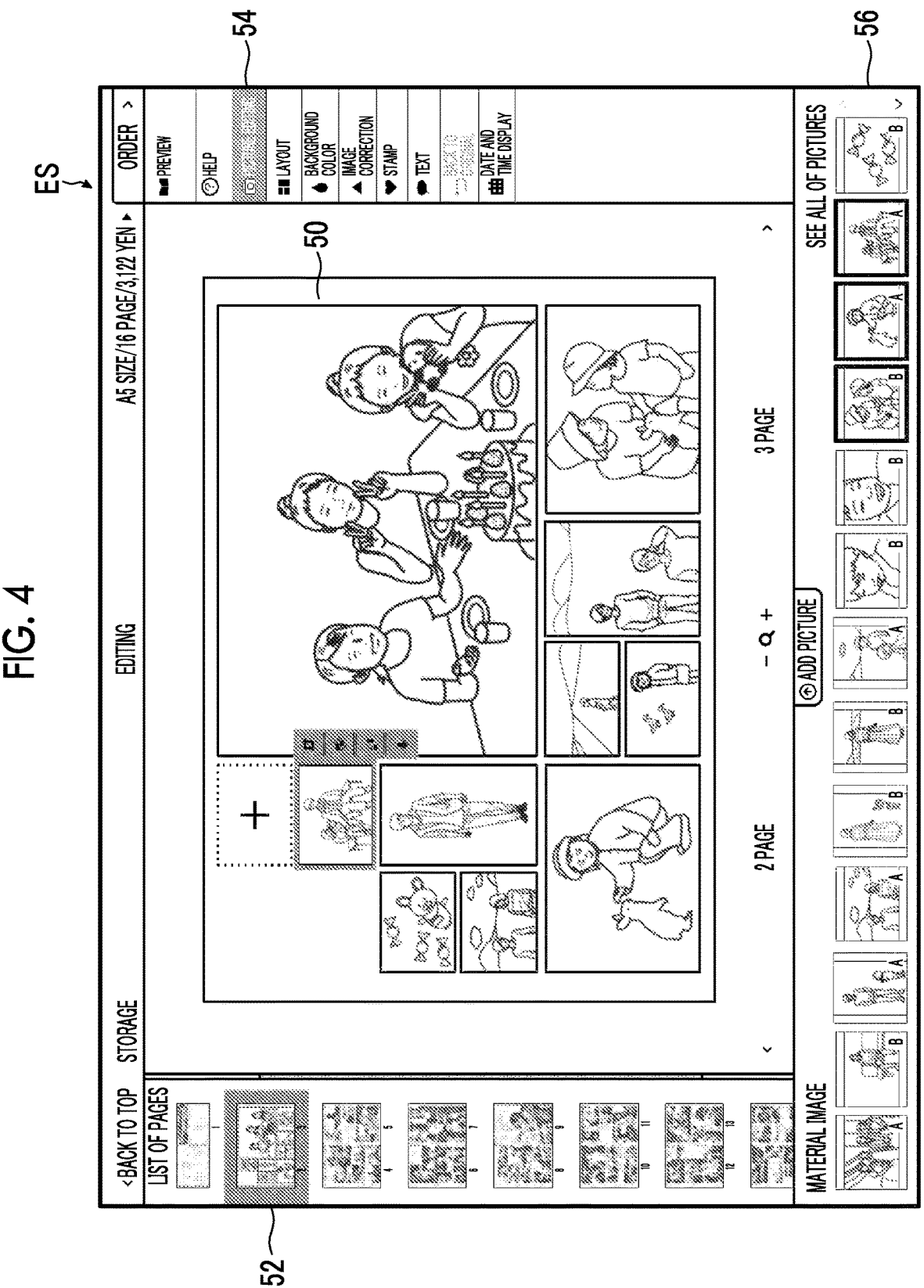
FIG. 4 is a diagram showing an example of an editing screen.

An editing screen ES shown in FIG. 4 is displayed on the user terminals 11 and 12 that receive the edited image data. The editing screen ES is displayed, for example, by receiving the edited image data in a state in which the order software is activated on the user terminals 11 and 12. In an image display region in the editing screen ES, an edited image 70 generated by the editing unit 35, that is, each page of the photo book is displayed.

An edited image 50 displayed on the editing screen ES can be switched by operating the screen. For example, in the editing screen ES, a list 52 of thumbnail images showing the pages (edited images) in the photo book is displayed on a left side of the image display region as shown in FIG. 4. In a case in which the user selects one thumbnail image in the list 52, the edited image 50 of the type corresponding to the selected thumbnail image (that is, the original image of the thumbnail image) is displayed in the image display region. Thereafter, in a case in which the user selects another thumbnail image from the list 52, the edited image 70 displayed in the image display region is switched to the edited image 50 of the type corresponding to the other thumbnail image.

Operation Reception Unit

The operation reception unit 37 executes an operation reception process of receiving each of the editing operations of the users belonging to the target group for each user. More specifically, the user terminals 11 and 12 of the users input (upload) the data indicating the content of the editing operation by each user. The operation reception unit 37 acquires (receives) the input data described above in the operation reception process, and stores the acquired data in the memory 22 or the storage 24.

As described above, the editing operation is the operation for giving the instruction for any one of change or maintenance of the edited image. Each user in the target group individually performs the editing operation in accordance with his/her intention or preference for the edited image. The description will be specifically made. As described above, the edited image is the image automatically created by the image generation device 10. Therefore, the user who views the edited image 50 through the editing screen ES gives the instruction for changing the edited image through the editing screen ES in a case in which the edited image 70 does not satisfy his/her intention, for example, the desired material image is not used or is few in the edited image 50. On the other hand, the user who determines that the edited image 70 is an image suitable for his/her intention gives the instruction for maintaining the edited image through the editing screen ES.

Each user belonging to the target group performs the editing operations of the number of pages of the photo book, and the operation reception unit 37 receives the same number of editing operations as the number of pages of the photo book for each user.

In addition, in the present embodiment, the operation reception unit 37 receives the editing operations of all of the users belonging to the target group (that is, for all of the plurality of users). Note that the present invention is not limited to this, and the editing operations of two or more users belonging to the target group need only be received. That is, the user who does not perform the editing operation may be included in the target group, and in this case, the editing operation of the user does not have to be received as a matter of course.

Analysis Unit

The analysis unit 38 executes an analysis process of analyzing the content of each of the editing operations received by the operation reception unit 37 for each user. More specifically, in the analysis process, the analysis unit 38 calculates the score corresponding to the content of each of the editing operations received for each user for each of the material image groups of the target group. The score calculated for each material image in the analysis process corresponds to a result of analysis in the analysis process.

More exactly, in the analysis process, the score of the material image calculated in the evaluation process is updated (recalculated) in accordance with the content of each of the editing operations received for each user. At this time, the analysis unit 38 calculates the score corresponding to the change content of the edited image in the editing operation for each of the material image groups of the target group.

An analysis procedure of the editing operation in the analysis process and a score calculation method are not particularly limited. Note that regarding a scoring standard for the score, it is preferable that the user who is a performer of the editing operation not be considered and the standard be common between the users. Here, for example, the scoring standard corresponds to a score calculation procedure (calculation rule), an addition value or a subtraction value of the score in each procedure.

Re-Editing Unit

The re-editing unit 39 executes a re-editing process of re-editing the edited image to generate the re-edited image based on a result of the analysis process by the analysis unit 38. In the re-editing process, the re-editing unit 39 re-selects the material image from the material image group of the target group based on the score for each material image calculated in the analysis process.

Thereafter, the re-editing unit 39 determines the layout of the selected material image and generates the edited image. At this time, the re-editing unit 39 follows the layout set in the editing process by the editing unit 35. That is, the re-editing unit 39 determines the layout of the material image based on the order operation, particularly the setting operation relating to the layout of the material image in the edited image, as in the editing unit 35. As a result, the re-edited image is generated.

Note that a standard for re-selection of the material image in the re-editing process and a determination method of the layout of the material image are not particularly limited.

In addition, in the re-editing process according to the present embodiment, the edited image is re-edited, that is, the re-edited image is generated for the page of the ordered photo book in which the editing operation for giving the instruction for change of the edited image is given. Note that the present invention is not limited to this, and re-editing of the edited image (that is, generation of the re-edited image) may be performed for all of the pages of the photo book.

Re-Output Unit

The re-output unit 40 executes a re-output process of outputting the re-edited image generated by the re-editing unit 39 to each user in the target group. More specifically, in the re-output process, the re-output unit 40 transmits display data of the re-edited image (hereinafter, re-edited image data) to the user terminals 11 and 12 of the users.

On the user terminals 11 and 12 that receive the re-edited image data, the editing screen ES described above is displayed, and the re-edited image is displayed in the image display region in the editing screen ES.

Image Generation Flow According to present Embodiment

Then, as an example of the image generation method according to the embodiment of the present invention, an operation flow of the computer that configures the image generation device 10 (hereinafter, referred to as an image generation flow) will be described.

Note that the image generation flow described below is merely an example, and unnecessary steps may be deleted or new steps may be added without departing from the gist of the present invention.

Figure 5:
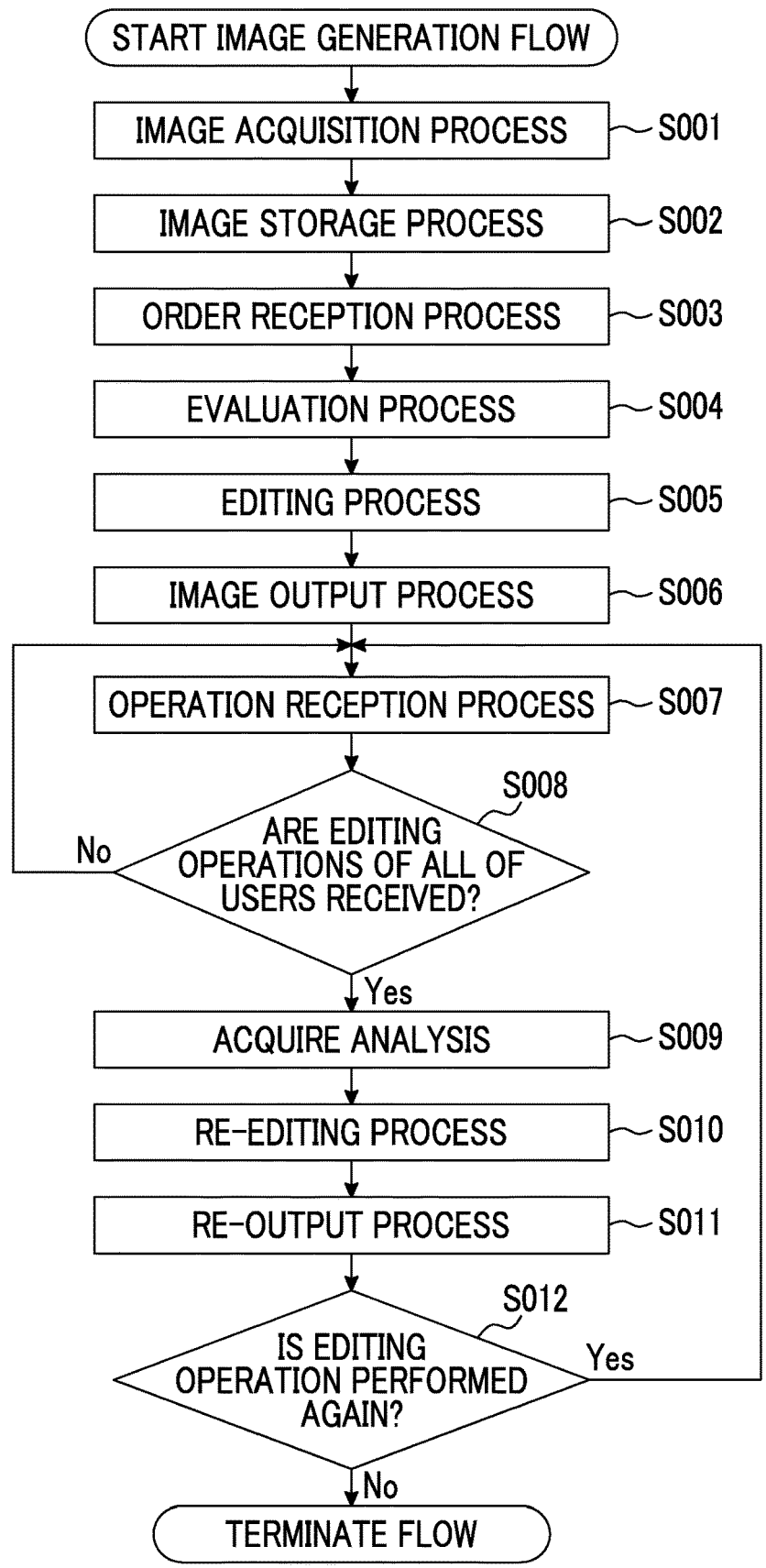
FIG. 5 is a diagram showing an operation flow of the image generation device according to the embodiment of the present invention.

The image generation flow proceeds in accordance with the flow shown in FIG. 5. Each step in the image generation flow shown in FIG. 5 is executed by the computer according to the program, and more specifically, is executed by the processor 21 of the server which is an example of the computer. Note that the program may be read by the computer from a recording medium on which the program is recorded, or may be acquired (downloaded) via a network, such as the Internet or an intranet.

In the following, as an example, a case will be described in which a group consisting of two users A and B is set as the target group and the photo book for the target group is created.

First, in the image generation flow, the image acquisition process is executed (S001). In the image acquisition process, the material image provided by each of the users A and B is acquired.

Figure 6:
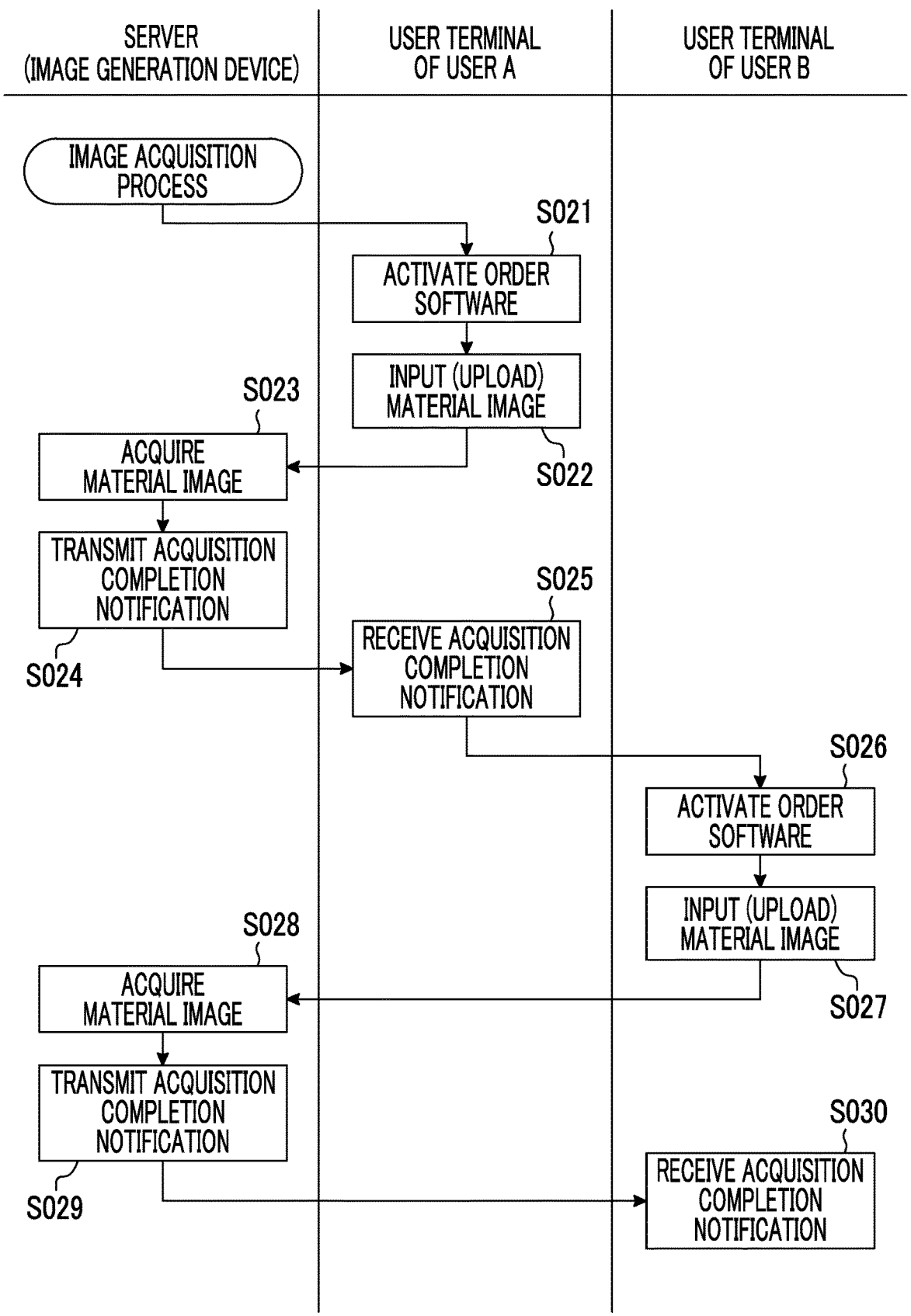
FIG. 6 is a diagram showing a flow of an image acquisition process.

The image acquisition process will be specifically described with reference to FIG. 6. In the image acquisition process, the user A operates the user terminal 11 to activate the order software, which is the Web application (S021). As a result, the order screen is displayed on the user terminal 11 and the user A selects the material image through the order screen.

The selected material image is input (uploaded) to the server, which is the image generation device 10 (S022). The server acquires (receives) the input material image, and at a point in time the acquisition of the input material image is completed, transmits an acquisition completion notification to the user terminal 11 (S023, S024). In a case in which the acquisition completion notification is received by the user terminal 11 (S025), for example, a predetermined notification message is output by the user terminal 11. As a result, the user A grasps that the input and the acquisition of the material image provided by him/herself are completed.

In the same procedure as the above, the user B provides the material image, and the server acquires the material image provided (input) from the user B (S026 to S030).

Note that a method of inputting (uploading) the material image is not limited to a method of activating the order software on the user terminals 11 and 12 and accessing the server, which is the image generation device 10, to input the material image. For example, a desktop application may be installed in the operating system (OS) of the user terminals 11 and 12, and the material image may be input (uploaded) by using an image upload function of the desktop application.

Then, an image storage process is executed (S002). In the image storage process, the material images acquired from the users A and B in the image acquisition process are stored in association with the users who are the providers, respectively. The description will be specifically made. The use accounts for using the photo book order service are given to the users A and B, and the material images acquired by the image acquisition process are stored in association with the use accounts of the users who are the providers, respectively.

In addition, in the image storage process, the group of the material images acquired from the users A and B is integrated as the material image group of the target group. Specifically, the material image, which is associated with the use account of the user A, and the material image, which is associated with the use account of the user B, are combined and integrated as the material image group of the target group.

Note that an integrating method of the material images is not limited to the method described above. For example, the user A activates the order software through the user terminal 11 and issues one-time URL by a function of the order software. The user B accesses the server from the one-time URL and provides (uploads) the material image. The material image, which is provided by such a procedure, may be integrated into the material image group of the target group.

In the following, the description will be made in assumption that the material images provided by the user A and the user B (that is, the material image group of the target group) are the seven material images shown in FIG. 7.

Then, the order reception process is executed (S003). In the order reception process, the order operation is received from each of the users A and B. Specifically, the server acquires (receives) data indicating the contents of the order operations performed by the users by communicating with the user terminals 11 and 12 of the users A and B, respectively. The content of the order operation include the number of pages of the photo book, the layout of the material image on each page (that is, the edited image), and the like.

Note that the order reception process may be executed at the same timing as the image acquisition process, or may be executed before the image acquisition process.

In addition, the order operation for the photo book for the target group may be performed only by the user corresponding to a representative of the target group. Alternatively, each user in the target group may individually perform the order operation. In this case, the contents of the order operations of the users may be aggregated, and various setting items may be set to the contents designated by more users. In addition, in a case in which the setting item is designated by a value, the setting item may be set to have an average value or an intermediate value of the values designated by the users in the target group (for example, the intermediate value between the maximum value and the minimum value among the designated values).

Then, the evaluation process is executed (S004). In the evaluation process, each of the material image groups of the target group is evaluated, specifically, the score is calculated for each of the material image groups of the target group.

An example of the score calculation method will be described. The evaluation standard is set from a plurality of viewpoints, points are determined in accordance with the evaluation standards for the material images, the points of the evaluation standards are totaled, and the total value is used as the score of the material image.

As specific example of the evaluation standard, the subject appearing in the material image may be detected and scoring (giving points) may be performed based on the detected subject. For example, a person appearing in the material image is detected, and the points may be given in accordance with the number of detected persons, a face (for example, whether or not to match the face of a specific person registered in advance), a facial expression, and a content of an action.

As another example of the evaluation standard, an object other than the person appearing in the material image may be detected, and scoring may be performed based on the detected object. For example, a landscape (scene), such as a night view, the sea, a sandy beach, and the sky, the object that characterizes an event, such as an athletic meet and a wedding ceremony, or an object showing a hobby or a preference, such as a food and an animal may be detected, and the points may be given in accordance with a result of the detection.

As a third example of the evaluation standard, a feature amount relating to an image quality of the material image may be specified, and scoring may be performed based on the specified feature amount. Examples of the feature amount relating to the image quality include image brightness (gradation value), hue (chroma saturation), contrast, and a degree of blurriness.

As a fourth example of the evaluation standard, an attribute of the material image may be specified from additional information of the material image, such as exchangeable image file format (Exif), and the points may be given based on the specified attribute. Examples of the attribute include an imaging location and an imaging date and time.

Note that the various evaluation standards described above, specifically, regarding a method of giving the points from each evaluation viewpoint, it is preferable that the user who is the provider of the material image not be considered and the standard be common between the users. That is, in the evaluation process, in a case in which the material image is evaluated (scored) by applying a unified evaluation standard without adding or subtracting the score in accordance with the user, the material image can be evaluated appropriately, which is preferable.

In the following, it is assumed that the result of evaluation shown in FIG. 8 is obtained for each of the material image groups of the target group shown in FIG. 7.

Then, the editing process is executed (S005). In the editing process, first, the material image to be used for generating the edited image is selected from the material image group of the target group based on the score for each material image calculated in the evaluation process. At this time, for example, in a case of generating a certain edited image, the material images as many as the number (necessary number) in accordance with the layout set for the certain edited image may be selected. More specifically, for example, the necessary number of material images may be selected in descending order of the score.

After the material image is selected, the layout of each selected material image is determined and the edited image is generated. At this time, based on the content of the order operation (that is, the order operation performed by at least one user) received in the order reception process, specifically, the setting operation relating to the layout of the material image in the edited image, the layout of the necessary number of material images is determined and the edited image is generated. In a case in which the layout of each material image is determined, for example, the layout may be determined such that the material image having a larger score is preferentially handled (for example, setting to a larger size).

In the editing process, by repeating the procedures described above, the edited images having the same number as the number of pages of the ordered photo book are generated.

In the image generation flow, the edited images having the same number of pages of the photo book are automatically generated by a series of steps S001 to S005 described above. That is, in a case in which the material image is provided by each of the users A and B and the order for the photo book for the target group is received, the material image used for generating the edited image is automatically selected by the function of the server and the layout of the selected material image is automatically determined.

Figure 9:
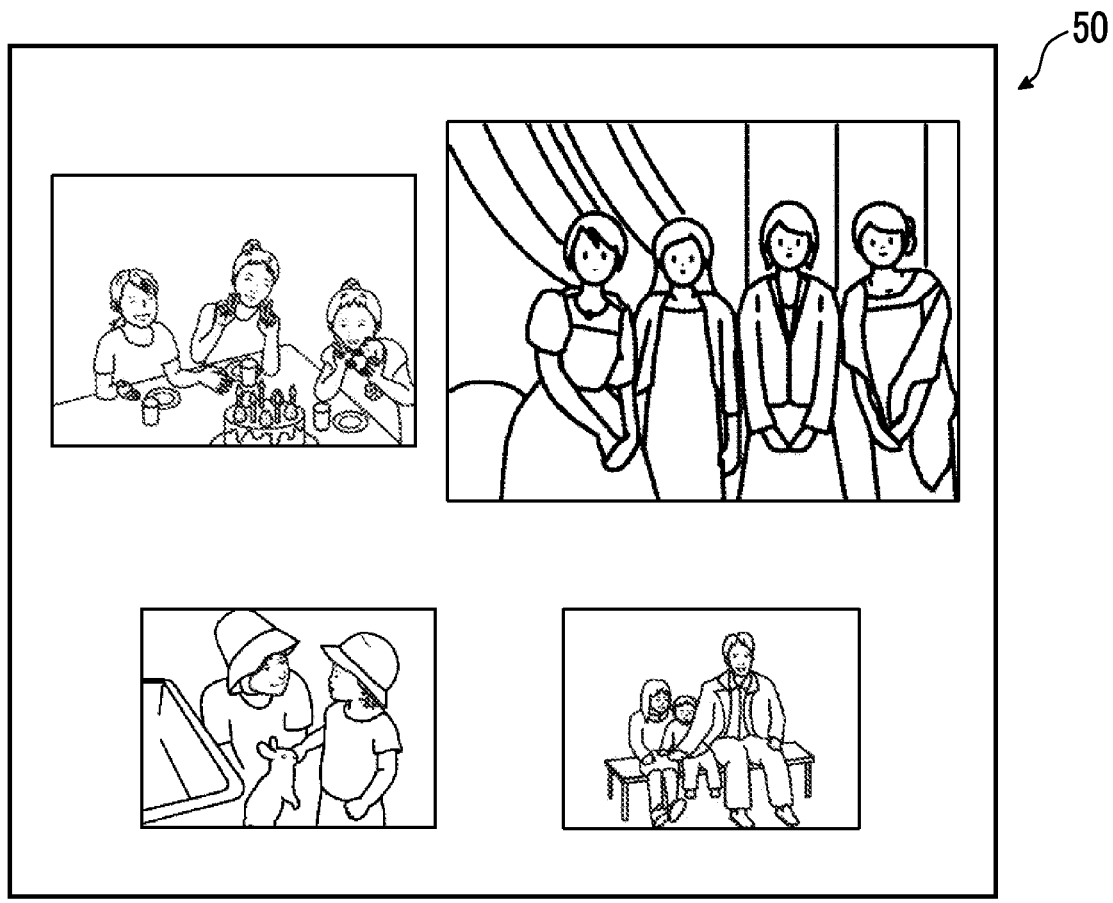
FIG. 9 is a diagram showing an example of an edited image.

In the following, it is assumed that four material images are selected from the material image group of the target group shown in FIG. 7 and the edited images shown in FIG. 9 are generated. The edited images shown in FIG. 9 are the edited images generated by using the material images (material images of #1, #2, #3, and #5) having the first to fourth high scores calculated in the evaluation process in the material image group of the target group.

Then, the image output process is executed (S006). Prior to the image output process, for example, an editing completion notification email may be transmitted from the server to the user terminals 11 and 12. In this case, in a case in which each of the users A and B confirms the editing completion through the order software and then performs an operation for confirming the edited image, the image output process is executed with the operation for confirming the edited image as a trigger.

The server transmits the edited image data to the user terminals 11 and 12 in the image output process. On the user terminals 11 and 12 that receive the edited image data, the editing screen ES shown in FIG. 4 is displayed, and the edited image 50, that is each page of the photo book is displayed in the image display region in the editing screen ES.

Figure 10:
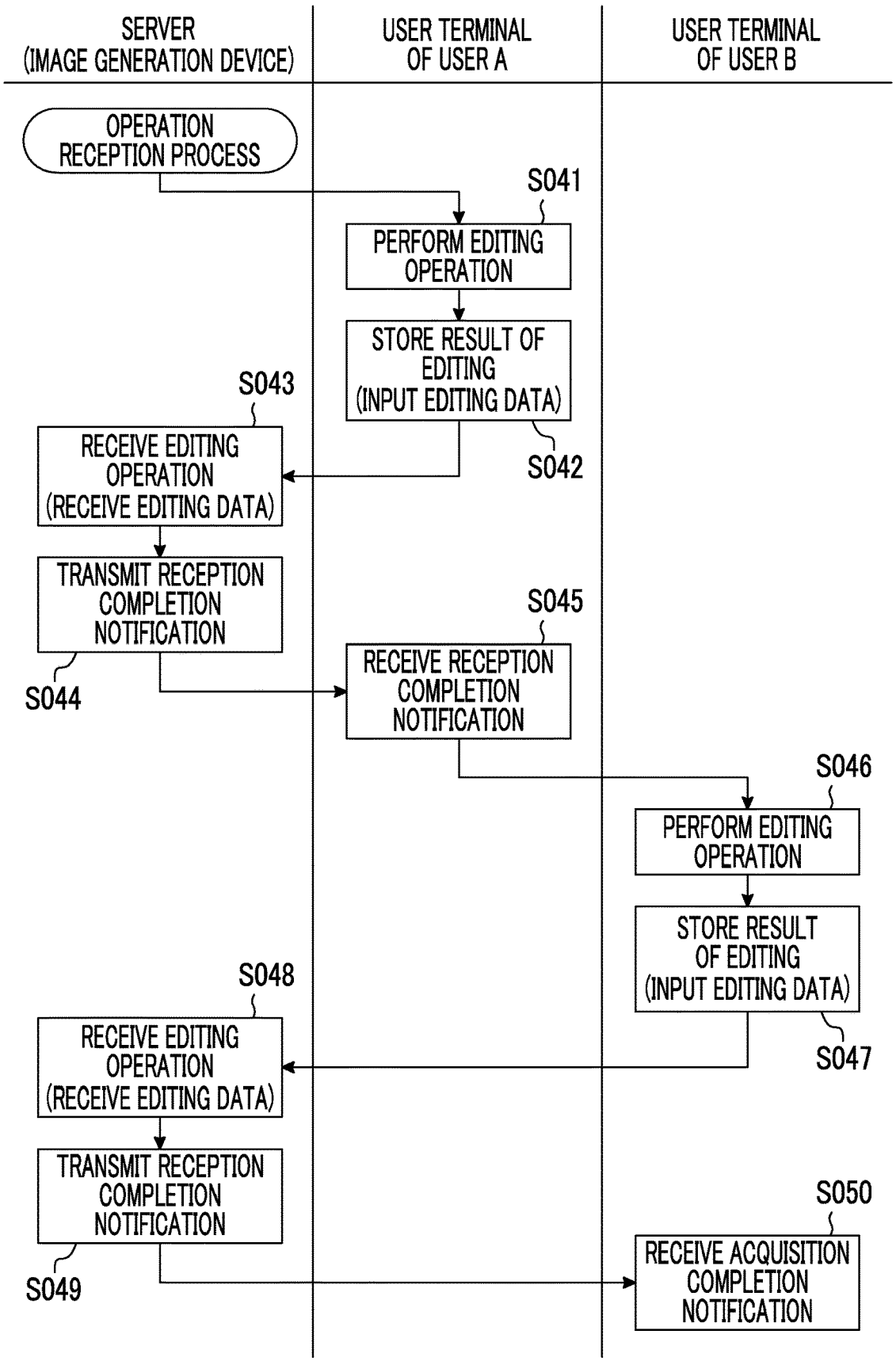
FIG. 10 is a diagram showing a flow from output of the edited image to reception of an editing operation of each user.

After the execution of the image output process, the operation reception process is executed (S007). In the operation reception process, each of the editing operations of the users A and B is received for each user. A flow from the output (display) of the edited image to the reception of the editing operation of each user will be described with reference to FIG. 10. The user A performs the editing operation through the editing screen ES on which the edited image 50 is displayed (S041).

In the editing operation, the user A gives the instruction for any one of change or maintenance of the edited image 50. In a case in which the edited image 50 is changed, an editing menu 54 on the editing screen ES is clicked, and, for example, one or both of the layout of the edited image 50 and the type of the material image used for generating the edited image 50 is changed.

In a case in which the layout of the edited image 50 is changed, the user A designates the material image, which is a change target, from among the displayed edited images 50, and performs an operation of designating the changed layout (size or disposition position) on the material image.

In a case in which the type of the material image used for generating the edited image 50 is changed, the user A replaces the material image in the edited image 50 with another material image, or adds a new material image to the edited image 50.

The description will be more specifically made. As shown in FIG. 4, a list 56 of the thumbnail images of the material image group of the target group is displayed below the image display region of the editing screen ES. The list 56 includes the thumbnail images of used images and the thumbnail images of unused images. The used image is the material image used for generating the edited image 50 in the editing process in the material image group of the target group. The unused image is the material image in the material image group of the target group that is not used for generating the edited image 50 in the editing process, that is, the material image other than the used image.

Note that in the list 56, the thumbnail image of the used image may be displayed in a display aspect different from that of the thumbnail image of the unused image. For example, as shown in FIG. 4, the thumbnail image may be displayed surrounded by a thick frame. In this case, the used image and the unused image can be easily identified from each other in the material image group of the target group.

In addition, as shown in FIG. 4, in the list 56, a name of the user who provides the material image which is the original image and the like (text information of "A" and "B" in FIG. 4) may be added to the thumbnail image. In this case, the user who is the provider can be easily grasped for each of the material image groups of the target group.

The user selects one or more thumbnail images from the list 56. As a result, an instruction for adopting the material image of the type corresponding to the selected thumbnail image, that is, the material image which is the original image of the thumbnail image is given. As a result, the edited image 50 displayed on the editing screen ES transitions to an image to which the material image (hereinafter, referred to as an adopted image) as instructed to be adopted is added.

In addition, the user A sets the layout of the adopted image through the editing screen ES. Specifically, the adopted image added to the edited image 50 is selected on the editing screen ES and an operation of setting the layout (size, disposition position, or position) of the adopted image is performed.

After performing the editing operation in the procedure described above, the user A operates the user terminal 11 and stores a result of editing (S042). As a result, the user terminal 11 inputs (uploads) the data indicating the content (hereinafter, editing data) of the editing operation performed by the user A to the server (S042). The server receives the editing operation of the user A by acquiring (receiving) the input editing data (S043). The acquired editing data is stored in the memory 22 or the storage 24.

Thereafter, the server transmits a reception completion notification of the editing operation to the user terminal 11 (S044). In a case in which the reception completion notification is received by the user terminal 11 (S045), for example, a predetermined notification message is output by the user terminal 11. As a result, the user A grasps that the reception of the editing operation is completed.

In the same procedure as the above, the user B performs the editing operation, and the server receives the editing operation of the user B through communication with the user terminal 12 (S046 to S050).

In the present embodiment, each of the editing operations for all of the users belonging to the target group, that is, the editing operations of the users A and B is received. As a result, it is possible to confirm the intentions and the requests of all of the users belonging to the target group for the edited image.

In addition, in the present embodiment, the editing operation of each user can be received at any time slot. That is, the start timing and the end timing of the editing operation do not have to be synchronized among the users. Therefore, since the users A and B can perform the editing operation independently, for example, it is possible to eliminate the burden of adjusting the layout among the users, and managing and performing status of the editing operation.

Further, at a point in time the reception of the editing operations of all of the users belonging to the target group is completed, the analysis process is executed (S008, S009). That is, in a case in which the editing data of all of the users belonging to the target group is aggregated in the server, the analysis process is started by using the aggregated editing data as a trigger.

In the analysis process, based on the content of each of the editing operations received for each user, the score is calculated for each of the material image groups of the target group, exactly, the score calculated in the evaluation process is updated (recalculated) in accordance with the content of the editing operation.

In the present embodiment, in the analysis process, the score corresponding to the change content of the edited image in the editing operation is calculated for each of the material image groups of the target group. At this time, the scoring standard common between the users may be applied to the editing operation received for each user, and the score of each of the material images may be calculated. That is, it is advisable to apply the unified scoring standard to calculate the score of the material image regardless of which user provides the material image. In this case, scoring can appropriately be performed with respect to the material image.

The scoring standard is not particularly limited, but examples thereof include scoring standards 1 to 4 as described below.

Scoring Standard 1

It is assumed that there is the user who gives the instruction for adopting the certain type of the material image in the editing operation in a case in which the score of the certain type of the material image in the material image group of the target group is calculated. In such a case, the calculation of the score of the certain type of the material image in accordance with the number of users who give the instruction for adopting the certain type of the material image corresponds to a scoring standard 1. Specific examples thereof include that the score of the material image is added by +50 points in a case in which there are two users who give the instruction adopting the same type of the material image in the editing operation, and that the score of the material image is added by +100 points in a case in which there are three users.

The material image that many users give the instruction for adopting in the editing operation is an image having high utility value for image editing, so that it is possible to reflect the utility value of the material image to the score by calculating the score of the material image in accordance with the scoring standard 1.

Scoring Standard 2

It is assumed that there is the user who gives the instruction for adopting the unused image in the editing operation in a case in which the score of the material image which is the unused image at a point in time of the editing process in the material image group of the target group is calculated. In such a case, the addition of a predetermined addition value to the score of the unused image corresponds to a scoring standard 2. Specific examples thereof include that the score of the unused image is added by +50 points in a case in which there is the user who gives the instruction for adopting the unused image in the editing operation.

The instruction for adopting the unused material image as the adopted image in the editing operation is the intention of the user who wants to review the used image, it is possible to reflect the intention to the score by calculating the score of the unused image as instructed as the adopted image in accordance with the scoring standard 2.

Scoring Standard 3

It is assumed that there is the user who gives the instruction for adopting the certain type of the material image in the editing operation in a case in which the score of the certain type of the material image in the material image group of the target group is calculated. In such a case, the calculation of the score of the certain type of the material image in accordance with the layout of the certain type of the material image as instructed by the user in the editing operation corresponds to a scoring standard 3. Specific examples thereof include that the score of the material image is added by +20 points in a case in which the editing operation of laying out the certain type of the material image in a size equal to or larger than a predetermined size is performed.

The material image set to a specific layout (for example, the largest display size) is the image that should be used preferentially, so that it is possible to reflect the priority or the importance of the material image to the score by calculating the score of such a material image higher in accordance with the scoring standard 3.

Scoring Standard 4

It is assumed that the target subject is specified based on a frequency of appearance in the plurality material images among the subjects appearing in a plurality of the material images as instructed to be adopted in a case in which the user gives the instruction for adopting the plurality of material images in the editing operation. In such a case, the calculation of the score of each of the material image groups of the target group in accordance with the presence or absence of appearance of the target subject in the material image corresponds to a scoring standard 4.

Specific examples of the scoring standard 4 include that a central person (target subject) is determined from among the plurality of material images as instructed to be adopted in the editing operation by the user and the score is added to the material image in which the central person appears. It will be more easily described. For example, it is assumed that many material images in which a person X appears are adopted in the editing operation of the user A, and many material images in which a person Y appears are adopted in the editing operation of the user B. In such a case, +50 points may be added to the material image in which the person X appears, +50 points may be added to the material image in which the person Y appears, and +100 points may be added to the material image in which both the persons X and Y appear.

The target subject that appears frequently in the material image as instructed to be adopted in the edited image is the subject important (having high priority) for the user. Therefore, the material image in which the target subject appears has a high utility value for the image editing, and thus it is possible to reflect the utility value of each material image to the score by calculating the score of such a material image in accordance with the scoring standard 4.

Another examples of the scoring standard 4 include that a frequently appearing subject (target subject) is determined from among the plurality of material images as instructed to be adopted in the editing operation by the user and the score is added to the material image in which the frequently appearing subject appears. Here, the frequently appearing subject reflects the preference or the hobby of the user, and examples thereof include a landscape, a food and an animal. A case will be more easily described in which the score is calculated in accordance with the presence or absence of the frequently appearing subject. For example, it is assumed that many material images in which the landscape appears are adopted in the editing operation of the user A, and many material images in which the animal appears are adopted in the editing operation of the user B. In such a case, +50 points may be added to the material image in which the landscape appears, and +50 points may be added to the material image in which the animal appears.

Note that it is preferable that the addition value in each of the 4 scoring standards described above can be optionally adjusted, in particular, in the scoring standard 2, it is advisable to set the addition value to a larger value in order to perform scoring for change based on the clear intention of the user. In addition, it is more suitable that the addition value of each scoring standard can be changed in accordance with the input operation of the users A and B belonging to the target group.

The scoring in the analysis process will be more easily described with a case shown in FIG. 11 as an example. In this case, the instruction for adopting the material images of #1, #2, #4, and #6 in the material image group of the target group is given in the editing operation of the user A, and the instruction for adopting the material images of #2, #4, #5, and #7 in the material image group of the target group is given in the editing operation of the user B. In addition, in the editing operation of the user A, the material image of #2 is laid out in a larger size.

In the analysis process executed in the case shown in FIG. 11, both the users A and B give the instruction for adopting the material images of #2 and #4, so that the score is added to the material images of #2 and #4 by applying the scoring standard 1. In addition, the material images of #4, #6 and #7 are the unused images at a point in time of the editing process, but the instruction for adopting the material images of #4, #6 and #7 is given in the editing operation, so that the score is added to the material images of #4, #6 and #7 by applying the scoring standard 2. In addition, since the size of the material image of #2 is set to be larger in the editing operation of the user A, the score is added to the material image of #2 by applying the scoring standard 3.

As a result of performing the scoring as the procedure described above, the scores of the material image groups of the target group at a point in time of the completion of the analysis process are as shown in FIG. 12.

The description is returned to the image generation flow. The re-editing process is executed after the analysis process is executed (S011). In the re-editing process, first, the material image used for generating the edited image (exactly the re-edited image) is re-selected from the material image group of the target group based on the score calculated for each material image in the analysis process. At this time, for example, the same number of the material images necessary for generating the edited image before re-editing may be selected, and specifically, the necessary number of the material images may be selected in descending order of the score.

Thereafter, the layout of the selected material image is determined and the re-edited image is generated. At this time, the layout may follow the layout set in the editing process. That is, in the re-editing process, as in the editing process, the layout of the material image may be determined and the re-edited image may be generated based on the order operation performed by the user, specifically, the setting operation relating to the layout of the material image in the edited image. For example, the layout of each material image may be determined such that the material image having a larger score is preferentially handled (for example, set to a larger size).

Figure 13:
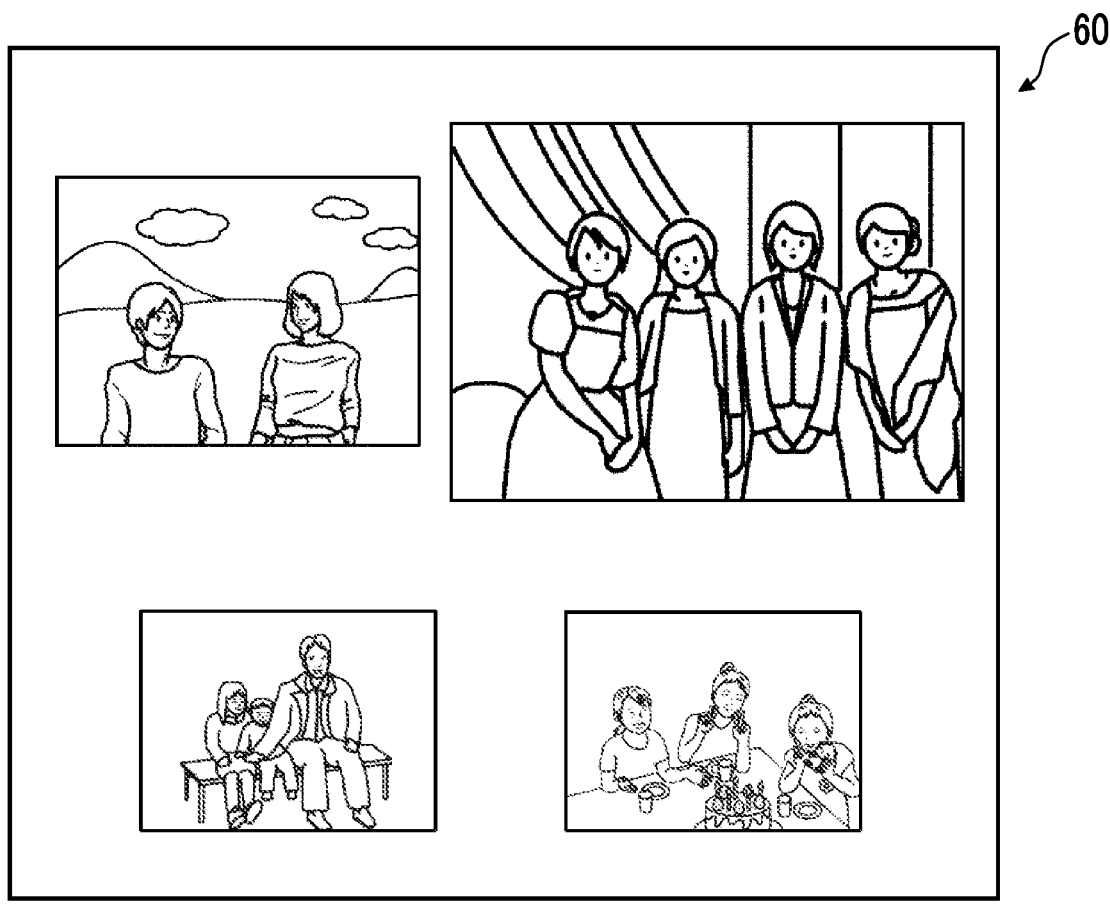
FIG. 13 is a diagram showing an example of a re-edited image.

As shown in FIG. 13, a re-edited image 60 generated by the procedure described above reflects the editing operations of the users A and B to the edited image 50. That is, the initial edited image 50 is automatically generated on the server side by using the material images of #1, #2, #3, and #5 in the material image group of the target group selected based on the score evaluated in the evaluation process (see FIGS. 8 and 9).

On the other hand, the re-edited image 60 is generated by using the material images of #1, #2, #3, and #4 re-selected based on the score calculated by the analysis process (see FIGS. 12 and 13). The score reflects the content of the editing operation of each of the users A and B.

As described above, the re-edited image 60 is generated based on the result of analysis in a case in which each of the editing operations of the users A and B with respect to the edited image 50 automatically generated on the server side is analyzed. As a result, the re-edited image 60 can be smoothly generated based on the opinions and the requests of the users relating to the image editing. Therefore, each page of the finally finished photo book is the image with the layout that reflects the intentions of the users A and B.

By the way, in a case of generating the re-edited image, in a case in which the content of the editing operation differs among the users, for example, in a case in which the number of the material images used for the edited image (number of images used) differs among the users, the average value of the number of images used may be obtained. Moreover, the number of the material images corresponding to the obtained average value may be selected in descending order of the score, and the re-edited image may be generated by using the selected material images.

In addition, in a case in which N material images used for generating the re-edited image are selected in descending order of the score, there may be the plurality of material images having the same score as the Nth material image. In this case, among the plurality of material images having the same score, the image that are far from the material images selected as the first to N−1 th by the determination in the time series, specifically, the image having largely different imaging date and time from these material images may be selected. Alternatively, in a case in which the plurality of material images having the same score are arranged based on each file name, the material images in the earliest order may be selected.

In the image generation flow, the re-output process is executed after the re-editing process is executed (S011). Prior to the re-output process, for example, a re-editing completion notification email may be transmitted from the server to the user terminals 11 and 12. In this case, in a case in which each of the users A and B confirms the re-editing completion through the order software and then performs an operation for confirming the edited image, the re-output process is executed with the operation for confirming the edited image as a trigger.

The server transmits the re-edited image data to the user terminals 11 and 12 in the re-output process. On the user terminals 11 and 12 that receive the re-edited image data, the editing screen ES is drawn, and the re-edited image 60 is displayed in the image display region in the editing screen ES.

On the editing screen ES, each of the users A and B confirms the re-edited image 60. At that time, each user can further perform the editing operation (hereinafter, the second and subsequent editing operations) on the re-edited image 60 by the same procedure as described above (S012). In such a case, the steps after step S007 described above will be repeated. That is, the second and subsequent editing operations are received for each user, the editing operations received for each user are analyzed, and re-editing of the edited image is performed again (regeneration of the re-edited image) based on the result of analysis.

As described above, by repeating the reception and the analysis of the editing operation and the re-editing of the edited image based on the result of analysis, it is possible to complete the photo book that both the users A and B are satisfied.

Finally, in a case in which the users A and B operate the user terminals 11 and 12 to approve the image (that is, the re-edited image) of each page of the photo book, the layout of each page of the photo book is decided, and at this point in time, the image generation flow is terminated.

Other Embodiments

Although the image generation device, the image generation method, and the program according to the embodiment of the present invention have been described above with specific examples, the embodiment described above is merely an example, and other embodiments may be considered.

In the embodiment described above, each page of the photo book, that is, the edited image is generated by using the plurality of material images, but the material image to be used for generating the edited image need only be at least one or more.

In addition, the edited image and the re-edited image are not limited to the images which constitute each page of the photo book, and may be traded as a single image, such as an image for a photo frame.

In addition, in the embodiment described above, as the example of the image generation device, the computer comprising the processor, specifically, the server computer has been described as an example. Note that the location of the processor provided in the image generation device according to the embodiment of the present invention is not limited to the server computer, and may be anywhere. For example, the processor may be provided in the user terminals 11 and 12, or may be provided in each of the server computer and the user terminals 11 and 12. In addition, in a case in which a plurality of processors are present, the plurality of processors may cooperate with each other.

The processor provided in the image generation device according to the embodiment of the present invention includes various processors. Examples of the various processors include a CPU, which is a general-purpose processor that executes software (program) and functions as various processing units.

In addition, various processors include a programmable logic device (PLD), which is a processor of which a circuit configuration can be changed after manufacturing, such as a field programmable gate array (FPGA) or the like.

Moreover, the various processors described above also include a dedicated electric circuit, which is a processor having a circuit configuration specially designed for executing specific processing, such as an application specific integrated circuit (ASIC).

In addition, one processing unit provided in the image generation device according to the embodiment of the present invention may be configured by one of the various processors described above, or may be configured by a combination of two or more processors of the same type or different types, for example, a combination of a plurality of FPGAs or a combination of the FPGA and the CPU.

In addition, a plurality of processing units provided in the image generation device according to the embodiment of the present invention may be configured by one of various processors, or may be configured by one processor in which two or more of the plurality of processing units are combined.

In addition, as in the embodiment described above, an aspect may be adopted in which one processor is configured by a combination of one or more CPUs and software, and the processor functions as the plurality of processing units.

In addition, for example, as represented by a system on chip (SoC) or the like, an aspect may be adopted in which a processor is used in which the functions of the entire system which includes the plurality of processing units in the image generation device are realized by a single integrated circuit (IC) chip. In addition, a hardware configuration of the various processors described above may be an electric circuit (circuitry) in which circuit elements, such as semiconductor elements, are combined.

EXPLANATION OF REFERENCES

10: image generation device
11, 12: user terminal
14: communication network
21: processor
22: memory
23: communication interface
24: storage
25: bus
31: image acquisition unit
32: image storage unit
33: order reception unit
34: evaluation unit
35: editing unit
36: image output unit
37: operation reception unit
38: analysis unit
39: re-editing unit
40: re-output unit
50: edited image
52, 56: list
54: editing menu
60: re-edited image
ES: editing screen

What is claimed is:

1. An image generation device comprising:
a processor,
wherein the processor executes
an image acquisition process of acquiring a material image provided by at least one of a plurality of users,
an editing process of generating an edited image by using the acquired material image,
an image output process of outputting the edited image to each of the plurality of users,
an operation reception process of receiving an editing operation by each of the plurality of users with respect to the edited image for each user,
an analysis process of analyzing a content of each of the editing operations received for each user, and
a re-editing process of re-editing the edited image to generate a re-edited image based on a result of analysis in the analysis process,
wherein in the image acquisition process, the processor acquires the material image from each of the plurality of users,
the processor further executes an evaluation process of evaluating each of the material images acquired in the image acquisition process based on a subject appearing in the material image and a feature amount relating to an image quality of the material image, and
in the editing process, the processor generates the edited image by using the material image selected based on a result of evaluation in the evaluation process from among the material images acquired in the image acquisition process.

2. The image generation device according to claim 1, wherein the processor executes the analysis process after receiving the editing operations of all of the plurality of users in the operation reception process.

3. The image generation device according to claim 1, wherein the edited image and the re-edited image are images constituting each page of a photo book having at least one page or more.

4. The image generation device according to claim 1, wherein the processor further executes an order reception process of receiving an order operation for image editing from each of the plurality of users, and in the editing process, the processor generates the edited image by using the material image based on a content of the order operation performed by at least one of the plurality of users.

5. The image generation device according to claim 4, wherein the order operation includes a setting operation relating to a layout of the material image in the edited image.

6. The image generation device according to claim 4, wherein in the image acquisition process, the processor acquires the material image from each of the plurality of users, in the analysis process, the processor calculates a score corresponding to the content of each of the editing operations received for each user for each of the material images acquired in the image acquisition process, and in the re-editing process, the processor generates the re-edited image by using the material image selected based on the score from among the material images acquired in the image acquisition process.

7. The image generation device according to claim 6, wherein the editing operation is an operation for giving an instruction for any one of change or maintenance of the edited image, the change of the edited image includes at least one of change of a layout of the material image in the edited image or change of a type of the material image used for generating the edited image, and in the analysis process, the processor calculates the score corresponding to a change content of the edited image in the editing operation for each of the material images acquired in the image acquisition process.

8. The image generation device according to claim 6, wherein in the analysis process, the processor applies a scoring standard common between the users to the editing operation received for each user, and calculates the score of each of the material images.

9. The image generation device according to claim 8, wherein in a case in which the score of a certain type of the material image among the material images acquired in the image acquisition process is calculated, the processor calculates the score of the certain type of the material image in accordance with the number of users who give an instruction for adopting the certain type of the material image in the editing operation.

10. An image generation device comprising:
a processor,
wherein the processor executes
an image acquisition process of acquiring a material image provided by at least one of a plurality of users,
an editing process of generating an edited image by using the acquired material image,
an image output process of outputting the edited image to each of the plurality of users,
an operation reception process of receiving an editing operation by each of the plurality of users with respect to the edited image for each user,
an analysis process of analyzing a content of each of the editing operations received for each user, and
a re-editing process of re-editing the edited image to generate a re-edited image based on a result of analysis in the analysis process,
wherein in the image acquisition process, the processor acquires the material image from each of the plurality of users, in the analysis process, the processor calculates a score corresponding to the content of each of the editing operations received for each user for each of the material images acquired in the image acquisition process, and in the re-editing process, the processor generates the re-edited image by using the material image selected based on the score from among the material images acquired in the image acquisition process.

11. The image generation device according to claim 10, wherein the editing operation is an operation for giving an instruction for any one of change or maintenance of the edited image, the change of the edited image includes at least one of change of a layout of the material image in the edited image or change of a type of the material image used for generating the edited image, and in the analysis process, the processor calculates the score corresponding to a change content of the edited image in the editing operation for each of the material images acquired in the image acquisition process.

12. The image generation device according to claim 10, wherein in the analysis process, the processor applies a scoring standard common between the users to the editing operation received for each user, and calculates the score of each of the material images.

13. The image generation device according to claim 12, wherein in a case in which the score of a certain type of the material image among the material images acquired in the image acquisition process is calculated, the processor calculates the score of the certain type of the material image in accordance with the number of users who give an instruction for adopting the certain type of the material image in the editing operation.

14. The image generation device according to claim 12, wherein in a case in which the score of an unused image which is not used for generating the edited image in the editing process among the material images acquired in the image acquisition process is calculated, the processor adds a predetermined addition value to the score of the unused image in a case in which a user who gives an instruction for adopting the unused image in the editing operation is present.

15. The image generation device according to claim 12, wherein in a case in which the score of a certain type of the material image among the material images acquired in the image acquisition process is calculated, the processor calculates the score of the certain type of the material image in accordance with a layout of the certain type of the material image as instructed by the user in the editing operation in a case in which a user who gives an instruction for adopting the certain type of the material image in the editing operation is present.

16. The image generation device according to claim 12, wherein in a case in which an instruction for adopting a plurality of the material images is given in the editing operation, the processor specifies a target subject based on a frequency of appearance in the plurality of material images from among subjects appearing in the plurality of material images, and calculates the score of each of the material images in accordance with presence or absence of appearance of the target subject in the material image.

17. An image generation method by a processor, the method comprising:
- a step of executing, by the processor, an image acquisition process of acquiring a material image provided by at least one of a plurality of users;
- a step of executing, by the processor, an editing process of generating an edited image by using the acquired material image;
- a step of executing, by the processor, an image output process of outputting the edited image to each of the plurality of users;
- a step of executing, by the processor, an operation reception process of receiving an editing operation by each of the plurality of users with respect to the edited image for each user;
- a step of executing, by the processor, an analysis process of analyzing a content of each of the editing operations received for each user; and
- a step of executing, by the processor, a re-editing process of re-editing the edited image to generate a re-edited image based on a result of analysis in the analysis process,
- wherein in the image acquisition process, the material image is acquired from each of the plurality of users by the processor,
- the method further comprises a step of executing, by the processor, an evaluation process of evaluating each of the material images acquired in the image acquisition process based on a subject appearing in the material image and a feature amount relating to an image quality of the material image, and
- in the editing process, by the processor, the edited image is generated by using the material image selected based on a result of evaluation in the evaluation process from among the material images acquired in the image acquisition process.

18. A non-transitory computer-readable medium having a program encoded thereon causing a computer to execute each step of the image generation method according to claim 17.

19. An image generation method by a processor, the method comprising:
- a step of executing, by the processor, an image acquisition process of acquiring a material image provided by at least one of a plurality of users;
- a step of executing, by the processor, an editing process of generating an edited image by using the acquired material image;
- a step of executing, by the processor, an image output process of outputting the edited image to each of the plurality of users;
- a step of executing, by the processor, an operation reception process of receiving an editing operation by each of the plurality of users with respect to the edited image for each user;
- a step of executing, by the processor, an analysis process of analyzing a content of each of the editing operations received for each user; and
- a step of executing, by the processor, a re-editing process of re-editing the edited image to generate a re-edited image based on a result of analysis in the analysis process,
- wherein in the image acquisition process, the material image is acquired from each of the plurality of users by the processor,
- in the analysis process, a score, which is corresponding to the content of each of the editing operations received for each user, is calculated by the processor for each of the material images acquired in the image acquisition process, and
- in the re-editing process, by the processor, the re-edited image is generated by using the material image selected based on the score from among the material images acquired in the image acquisition process.

20. A non-transitory computer-readable medium having a program encoded thereon causing a computer to execute each step of the image generation method according to claim 19.

* * * * *